Sept. 13, 1966  H. L. RATLIFF, JR  3,272,069
APPARATUS FOR VIEWING WIDE-ANGLE STEREOSCOPIC PICTURES
Filed April 1, 1965  2 Sheets-Sheet 2

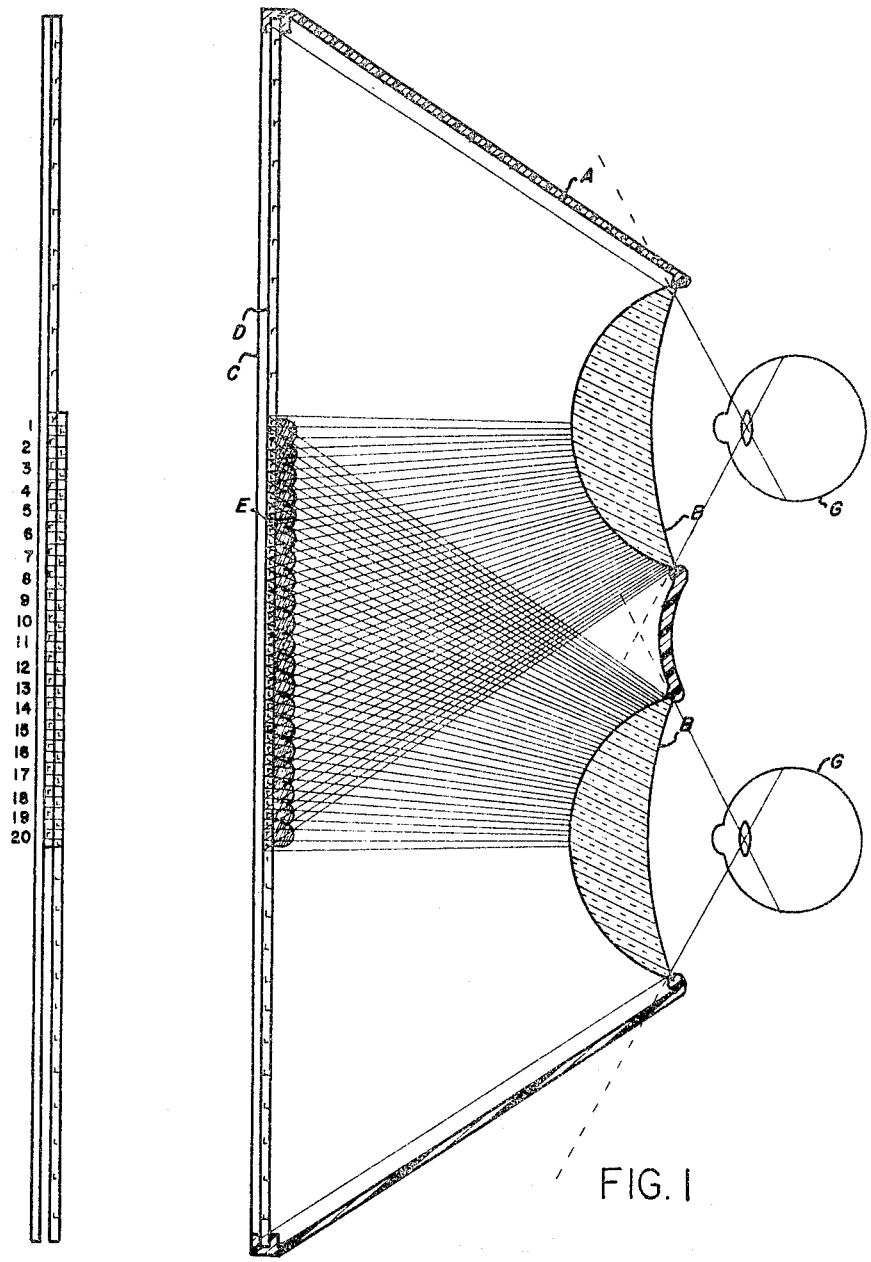

INVENTOR.
Harvey L. Ratliff Jr.

United States Patent Office 3,272,069
Patented Sept. 13, 1966

3,272,069
APPARATUS FOR VIEWING WIDE-ANGLE
STEREOSCOPIC PICTURES
Harvey L. Ratliff, Jr., Lubbock, Tex., assignor to
Jetru Inc., Amarillo, Tex.
Filed Apr. 1, 1965, Ser. No. 447,600
4 Claims. (Cl. 88—29)

This application is a continuation-in-part of my co-pending application Serial Number 237,795 filed Nov. 15, 1962 now abandoned.

The present invention relates generally to wide-angle stereoscopic viewing devices and particularly to means and apparatus for eliminating the strip (and its constricting effect) dividing the left eye view from the right eye view.

It is the primary object of the present invention to teach a system wherein a line or a strip separating the two eye views is not visible to either eye of the viewing observer and wherein the wrong eye view is not visible as such to either eye.

It is a further object of the present invention to eliminate the need for making the ocular focal lengths extremely short, although they are relatively short, in order to re-create extremely wide-angle stereoscopic scenes.

Other objects and advantages of my invention will become apparent from a study of the following description with the accompanying drawings wherein:

FIG. 1 is a diagrammatic illustration of the first contemplated embodiment of my invention.

FIG. 2 is a diagrammatic illustration of a picture and concepts related thereto which is usable in the present invention.

Reference is now made to FIG. 1. There is provided an enclosed hollow casing A which supports oculars B with their axes substantially parallel and approximately the interpupillary distance apart. Of course oculars B do not have to be specifically as shown, i.e. they could be plano-convex.

Casing A includes as a part thereof a diffusing screen C which supports a single composite picture D. The picture or image D is made up of a right eye view portion labelled with only $r$, left eye view portion labelled with only $L$, and central portion with strip elements in alternate conjugate relation labelled respectively $r$ and $L$ of both the right and left eye views in overlapped relationship.

In the contemplated form of the invention shown in FIG. 1, the strips $r$ and $L$ are vertical, long, very narrow and are alternately interlaced so that adjacent strips are respectively strip images of the right and left eye view.

There is a means E provided, which in the case of FIG. 1 is a lenticular screen, which coacts with elements $r$ and $L$ to separate the strip images in the central portion of D into the respective right and left eye views as seen through B by G (G being the eyes of a viewer). Of course the grating screen E' of FIG. 3, by way of example, could be used in the device of FIG. 1.

In this manner wide-angle scenes may be viewed through oculars B with no visible strip or line between the left and right eye views.

Figure 4:
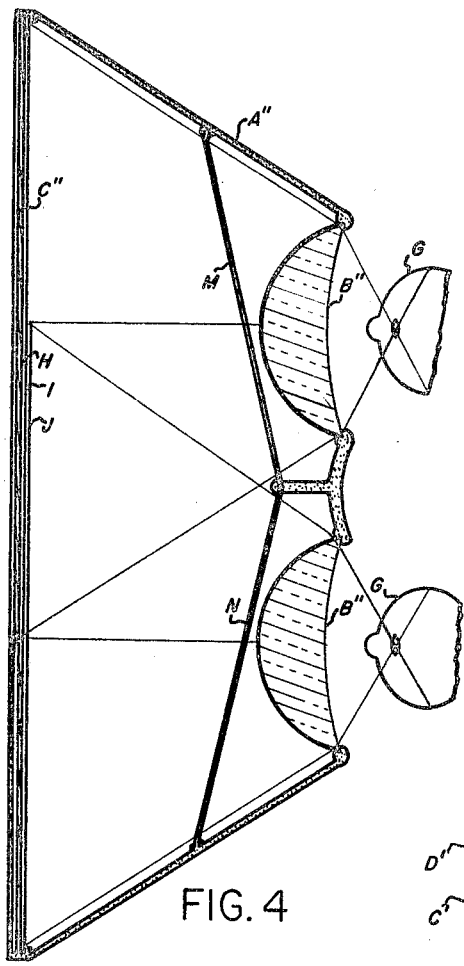
FIG. 4 is a diagrammatic illustration of the third contemplated embodiment of my invention.
Figure 3:
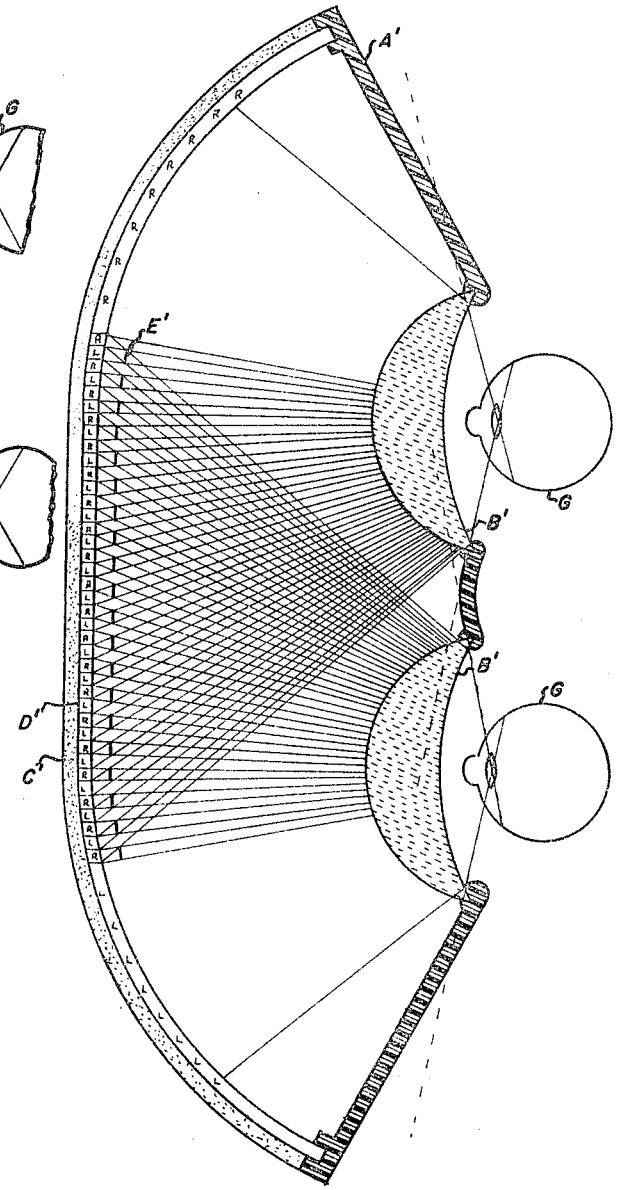
FIG. 3 is a diagrammatic illustration of the second contemplated embodiment of my invention.
Figure 5:
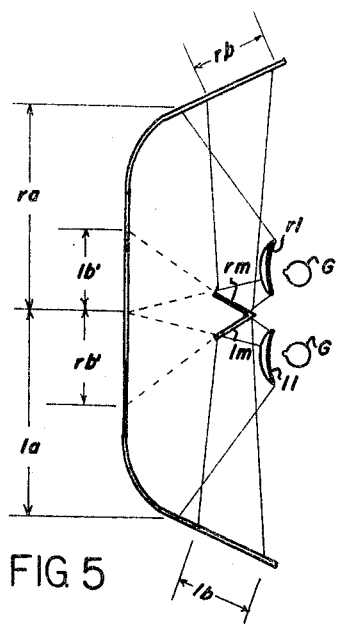
FIG. 5 is a diagrammatic illustration of the fourth contemplated embodiment of my invention.

Other embodiments of the invention are shown in FIGS. 3, 4, and 5. As shown in FIG. 1, screen C is translucent, picture D is a transparency, and casing A is opaque except for screen C; however, picture D could be in opaque form and casing A in translucent form.

When the casing A is translucent the device of FIG. 1 takes the form of FIG. 4.

Reference is now made to FIG. 4. Elements A", B", and C" function as described for FIG. 1 hereinabove with the exception which was also set forth hereinabove, each function corresponding to that of A, B, and C respectively.

The picture of FIG. 4 is different; however, a well known operative conventional system is used to make the picture elements of I polarizing in one plane and the picture elements of J polarizing in another plane which is rotated 90° from that of the first plane, i.e. that of I. Both I and J are overlapped as shown and backed by reflecting surface H in the well known manner.

Cross polarizers M and N coact in the well known manner with regard to the central portions of I and J to produce the same desired result set forth hereinabove for FIG. 1, i.e. the elimination of any visible demarcation between the two wide angle views.

Reference is now made to FIG. 3. Elements A', B', C', D', and E' perform the same function as elements A, B, C, D, and E respectively of FIG. 1 as described hereinabove. FIG. 3 differs from FIG. 1 in design only by being designed for as wide angle stereoscopic re-creation as is possible without being limited to flat composite images, while the device of FIG. 1 is designed for flat composite images.

Reference is now made to FIG. 5. This figure illustrates an embodiment which may prove practical. This embodiment uses mirrors $rm$ and $lm$ to provide the eyes G respectively with a view of pictures $rb$ and $lb$ respectively which would normally have to be placed in the areas $rb'$ and $lb'$ respectively. So the right eye would see $ra$ and apparently $rb'$, but actually $ra$ and an image of $rb$. The left eye would see $la$ and apparently $lb'$ but actually $la$ and an image of $lb$.

It may be seen from observing FIGS. 1 and 3 that only the rays leaving the elements labelled $r$ can reach the right ocular because of screen E (or E') and that only the rays leaving the elements labelled L can reach the left ocular because of screen E (or E'), the coaction therebetween being well known in the art of parallax stereoscopy.

The picture could be in the composite arrangement of FIG. 2 as well as that of FIG. 1, also the arrangement of FIG. 2 could be used in the process for producing the picture of FIG. 1.

It is pointed out that the lenses of FIGS. 1, 3, 4, and 5 may be of the variable focal length type described in lines 23–32 of page 12 of my co-pending prior application Serial No. 250,562 as originally filed on January 10, 1963 or as described in my co-pending prior application 275,411 filed April 24, 1963.

While the invention has been disclosed and described in some detail in the drawings and foregoing description, they are to be considered as illustrative and not restrictive in character, as other modifications may readily suggest themselves to persons skilled in the art and within the broad scope of the invention, reference being had to the appended claims.

What I claim is:

1. A wide angle stereoscopic viewing device comprising: an enclosed hollow casing; two positive wide angle oculars, supported by said casing having relatively short focal lengths and having their axes substantially parallel and spaced by the normal spacing of a viewer's eyes and having diameters greater than approximately 20 millimeters in the dimensions perpendicular to their axes and parallel to a line joining a viewer's eyes; a single composite picture supported at the focal plane of said oculars in a position to be viewed through said oculars, said picture consisting of respective right and left eye views that are overlapped in a central portion of the composite picture, the central overlapped portions of the respective views are made up of a multiplicity of vertical strip images that are interlaced so that adjacent strips are respectively strip images of the right and left eye view; means coacting with said picture to separate the strip images in the central portion of said picture into the respective right and left eye views as seen through said oculars, whereby the overlapping of the views only in the central portion of the composite picture eliminates the viewing of a dividing line between the left and right eye views.

2. The device of claim 1 wherein said means coacting with said picture is a grating screen.

3. The device of claim 1 wherein said means coacting with said picture is a lenticular screen.

4. A wide angle stereoscopic viewing device comprising: an enclosed hollow casing; two positive wide angle oculars, supported by said casing having relatively short focal lengths and having their axes substantially parallel and spaced by the normal spacing of a viewer's eyes and having diameters greater than approximately 20 millimeters in the dimension perpendicular to their axes and parallel to a line joining a viewer's eyes; a single composite picture supported at a focal plane of said oculars in a position to be viewed through said oculars, said picture consisting of respective right and left eye views that are overlapped in a central portion of the composite picture, the central overlapped portion consisting of overlying differently polarized right and left images; analyzing means coacting with said picture to separate the right and left images in the central portion of said picture into the respective right and left eye views as seen through said oculars, whereby the overlapping of the views only in the central portion of the composite picture eliminates the viewing of a dividing strip between the left and right eye views.

References Cited by the Examiner

UNITED STATES PATENTS

| | | | |
|---|---|---|---|
| 1,673,793 | 6/1928 | Ames | 95—18 |
| 1,882,424 | 10/1932 | Ives | 95—18 |
| 2,218,875 | 10/1940 | Parsell. | |
| 2,562,077 | 7/1951 | Winnek | 88—29 |
| 2,627,781 | 2/1953 | Welborn | 88—29 |
| 2,674,156 | 2/1954 | Mahler. | |
| 2,883,906 | 4/1959 | Rehorn | 88—29 |
| 2,930,142 | 3/1960 | Domeshek. | |
| 2,953,980 | 9/1960 | Montebello | 95—18 X |
| 2,955,156 | 10/1960 | Heilig. | |

OTHER REFERENCES

Van Alabada, col. L.E.W., "A Wide-Angle Stereoscope and a Wide-Angle View-Finder," Transactions of the Optical Society of London, vol. 25, 1923–24, pp. 249–257, 259–260.

JEWELL H. PEDERSEN, *Primary Examiner.*

O. B. CHEW, *Assistant Examiner.*